United States Patent [19]

Thomas

[11] Patent Number: 5,228,359
[45] Date of Patent: Jul. 20, 1993

[54] STEERING COLUMN BRACKET ASSEMBLY

[75] Inventor: David E. Thomas, Rochester Hills, Mich.

[73] Assignee: Chrysler Corporation, Highland Park, Mich.

[21] Appl. No.: 884,814

[22] Filed: May 18, 1992

[51] Int. Cl.⁵ .............................. B62D 1/19
[52] U.S. Cl. ...................... 74/492; 188/371
[58] Field of Search ............ 74/492; 188/371; 280/777

[56] References Cited

U.S. PATENT DOCUMENTS

| | | | |
|---|---|---|---|
| 4,117,741 | 10/1978 | Yazane et al. | 74/492 |
| 4,616,522 | 10/1986 | White et al. | 74/492 |
| 4,627,306 | 12/1986 | Berenjian | 74/492 |
| 4,951,522 | 8/1990 | Chowdhury et al. | 74/492 |
| 5,052,715 | 10/1991 | Ervin et al. | 74/493 X |
| 5,082,311 | 1/1992 | Melotik | 280/777 |

Primary Examiner—Allan D. Herrmann
Attorney, Agent, or Firm—Edward A. Craig

[57] ABSTRACT

A steering column bracket assembly for a collapsible vehicle steering column includes at least one support bracket for attaching one portion of the steering column to vehicle support structure and a mounting bracket for attaching another portion of the steering column to vehicle support structure and including a structure for restraining movement of the steering column along its longitudinal axis. The steering column bracket assembly also includes a structure attached to the mounting bracket for absorbing energy of the steering column during a collision type impact of the vehicle.

13 Claims, 2 Drawing Sheets

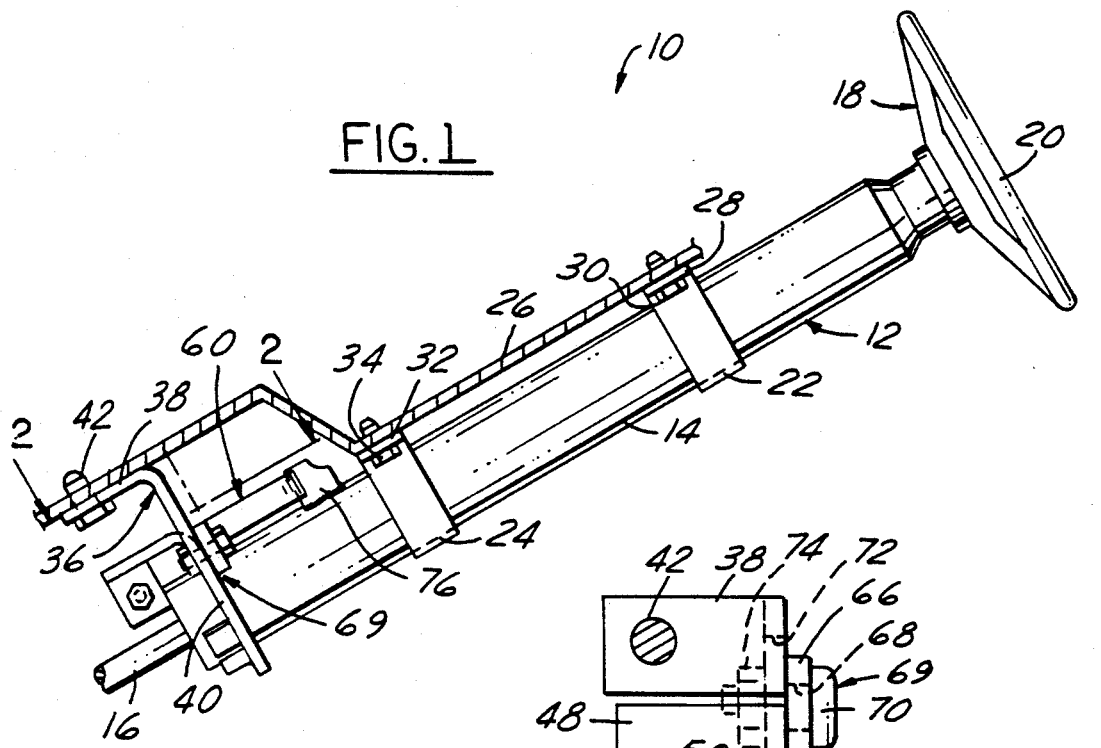
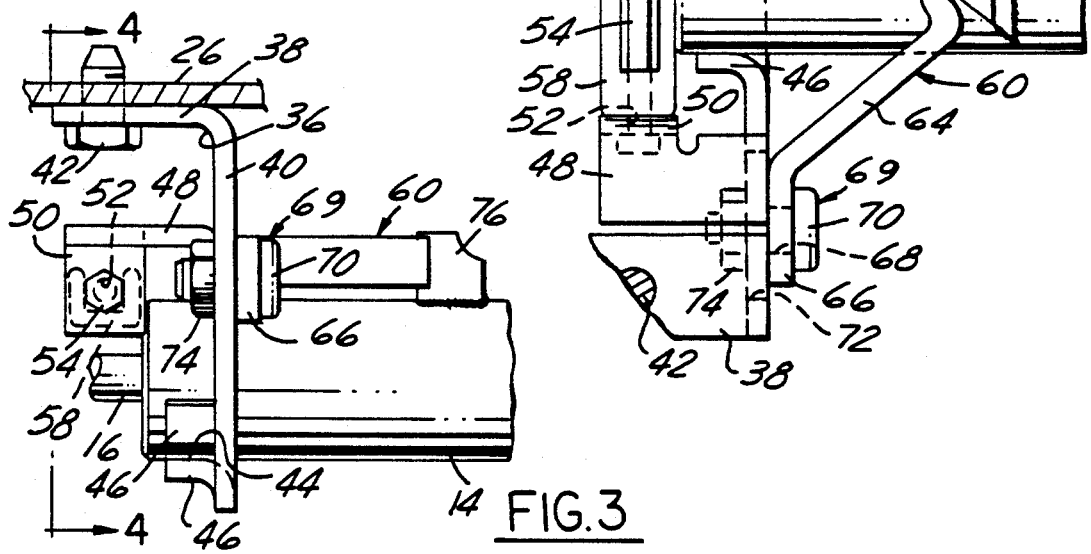

STEERING COLUMN BRACKET ASSEMBLY

BACKGROUND OF THE INVENTION

1. Field of the Invention

The present invention relates generally to energy absorbing steering columns, and more particularly to a bracket assembly for a collapsible energy absorbing steering column.

2. Description of the Related Art

It has been known to provide various collapsible and energy absorbing steering columns in automotive vehicles to reduce injury to a driver during a collision type impact of the automotive vehicle. An example of such a collapsible energy absorbing steering column is disclosed in U.S. Pat. No. 4,117,741 to Yazane et al.

Accordingly, there has been a need in the art to provide a bracket assembly for a steering column which absorbs energy of the steering column during a collision type impact of the automotive vehicle. There has also been a need in the art to provide a bracket assembly for a collapsible energy absorbing steering column which allows greater movement of the steering column along its original attitude or longitudinal axis during a collision type impact. Further, there has been a need in the art to provide a bracket assembly for a collapsible energy absorbing steering column which yields a relatively constant force versus deflection during a collision type impact.

SUMMARY OF THE INVENTION

It is, therefore, one object of the present invention to provide a bracket assembly for a steering column.

It is another object of the present invention to provide a bracket assembly for a steering column which absorbs energy of the steering column during a collision type impact.

It is yet another object of the present invention to provide a bracket assembly for a collapsible energy absorbing steering column which allows greater movement of the steering column along its longitudinal axis during a collision type impact.

It is still another object of the present invention to provide a bracket assembly for a collapsible energy absorbing steering column which yields a relatively constant force versus deflection during a collision type impact.

It is a further object of the present invention to provide a new and improved bracket assembly for a collapsible energy absorbing steering column.

To achieve the foregoing objects, the present invention is a steering column bracket assembly for a collapsible energy absorbing vehicle steering column including at least one support bracket for attaching one portion of the steering column to vehicle support structure. The steering column bracket assembly also includes a mounting bracket for attaching another portion of the steering column to vehicle support structure and having shearable means for restraining movement of the steering column along its longitudinal axis. The steering column bracket assembly also includes bendable means joined to the mounting bracket for absorbing energy of the steering column during a collision type impact.

One advantage of the present invention is that a bracket assembly is provided for a collapsible energy absorbing steering column. Another advantage of the present invention is that the bracket assembly absorbs energy of the steering column and allows greater movement of the steering column along its longitudinal axis during a collision type impact. Yet another advantage of the present invention is that the bracket assembly may use a slip joint attachment to yield a relatively constant force versus deflection during a collision type impact without a plurality of deformable parts.

Other objects, features and advantages of the present invention will be readily appreciated as the same becomes better understood after reading the following description taken in conjunction with the accompanying drawings.

BRIEF DESCRIPTION OF THE DRAWINGS

FIG. 1 is an assembled perspective view of a steering column bracket assembly according to the present invention shown in operational relationship with a steering column.

FIG. 2 is a view taken along lines 2—2 of FIG. 1.

FIG. 3 is a view similar to FIG. 2 rotated ninety degrees.

DESCRIPTION OF THE PREFERRED EMBODIMENT(S)

Figure 4:
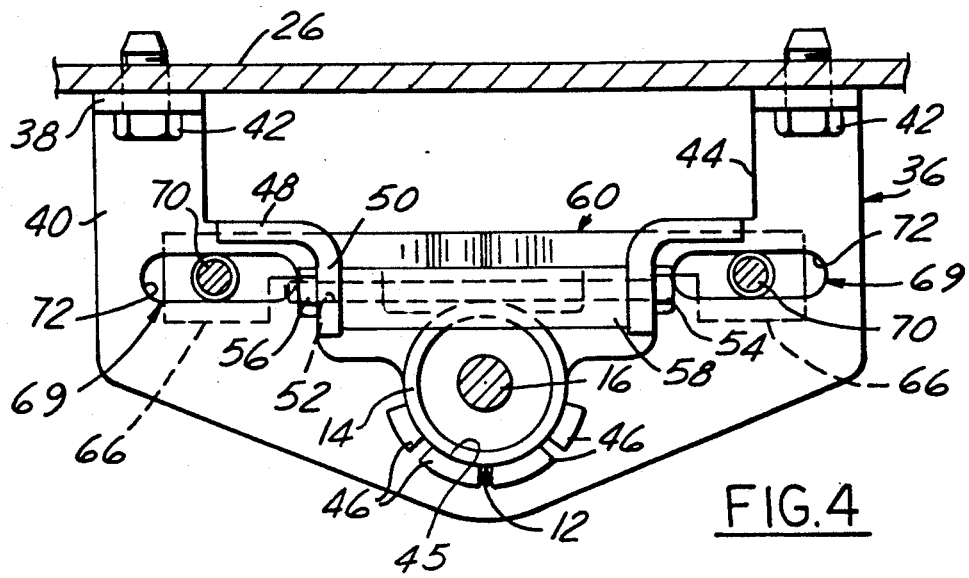
FIG. 4 is a view taken along lines 4—4 of FIG. 3.

Referring now to the drawings, especially to FIG. 1, a steering column bracket assembly is generally shown at 10 in operational relationship with a steering column, generally indicated at 12 and of the collapsible energy absorbing type, for an automotive vehicle (not shown). The steering column 12 includes a rigid sleeve 14 and a steering shaft 16 which is connected to a steering wheel assembly 18 at its upper end and to a shaft coupler (not shown) at its lower end. It should be appreciated that the shaft coupler is operably connected to a steering gear assembly (not shown) for steering of the wheels of the automotive vehicle. The steering wheel assembly 18 includes a steering wheel 20. It should be appreciated that the steering wheel assembly 18 may include a gear shift, turn signal switch and hazard warning light switch (not shown).

The steering column bracket assembly 10 includes an upper support bracket 22 and a lower support bracket 24 for attaching the steering column 12 to vehicle support structure such as a dash panel 26 of the automotive vehicle. The upper support bracket 22 has a generally U-shaped configuration with flanges 28 extending outwardly and perpendicularly to the U-shape. The flanges 28 of the upper support bracket 22 are attached to the dash panel 26 by suitable means such as fasteners 30.

The lower support bracket 24 has a generally U-shaped configuration with flanges 32 extending outwardly and perpendicularly to the U-shape. The flanges 32 of the lower support bracket 24 are attached to the dash panel 26 by suitable means such as fasteners 34. It should be appreciated that the upper and lower support brackets 22 and 24 allow downward movement of the steering column 12 along its original attitude or longitudinal axis during a collision type impact of the automotive vehicle.

Referring to FIGS. 2 through 4, the steering column bracket assembly 10 includes an energy absorbing mounting bracket, generally indicated at 36, for attaching a lower end of the steering column 12 to the dash panel 26. The mounting bracket 36 has a generally L-shaped configuration formed by a first or short flange portion 38 and a second or long flange portion 40. The short flange portion 38 is secured to the dash panel 26 by suitable means such as fasteners 42. The long flange portion 40 has an opening 44 with a generally stepped configuration and a recess 45 with a generally arcuate shape at the end opposite the short flange portion 38. The recess 45 is adapted to receive the rigid sleeve 14 of the steering column 12. The long flange portion 40 also has a plurality of flanges 46 adjacent the recess 45 and extending axially along the rigid sleeve 14. The flanges 46 provide additional support for the steering column 12 and act to guide the steering column 12 along its longitudinal axis during a collision type impact. The long flange portion 40 includes side flanges 48 extending outwardly and perpendicularly from the step of the opening 44. The side flanges 48 include end flanges 50 extending outwardly and perpendicularly therefrom. The end flanges 50 have an aperture 52 extending therethrough.

The steering column bracket assembly 10 includes a fastener 54 extending through the apertures 52 of the end flanges 50 and removeably secured to the mounting bracket 36 by suitable means such as a nut 56. The steering column bracket assembly includes a shear member 58 disposed about the fastener 54 between the end flanges 50. The shear member 58 has a general elongated U-shape and partially overlaps the end of the rigid sleeve 14. The shear member 58 provides a predetermined shear force for restraining movement of the steering column 12 along its longitudinal axis. It should be appreciated that the steering column 12 must overcome the predetermined shear force during a collision type impact to allow longitudinal movement of the steering column 12.

The steering column bracket assembly 10 includes an energy absorbing bend strap, generally indicated at 60, for absorbing downward movement of the steering column 12 during a collision type impact. The bend strap 60 has a laterally extending center portion 62 interconnecting a pair of longitudinally extending side portions 64. The center portion 62 is generally arcuate in shape and the side portions 64 are inclined outwardly laterally. The side portions 64 include a mounting flange 66 extending laterally and outwardly therefrom. The mounting flanges 66 have an aperture 68 extending therethrough. It should be appreciated that the center portion 62 may have any suitable shape to cooperate with a force director 76 to be described.

Referring to FIG. 4, the steering column bracket assembly 10 includes a slip joint attachment or assembly, generally indicated at 69, for joining or connecting together the bend strap 60 and mounting bracket 36. The slip joint assembly 69 includes fasteners 70 for securing the bend strap 60 to the mounting bracket 36. The slip joint assembly 69 also includes a pair of spaced elongated apertures 72 extending through the long flange portion 40 of the mounting bracket 36. The fasteners 70 extend through the apertures 68 in the mounting flanges 66 and apertures 72 in the long flange portion 40 and are secured thereto by suitable means such as nuts 74. It should be appreciated that the nuts 74 are tightened such that the fasteners 70 may be allowed to move along the apertures 72 during a collision type impact.

The steering column bracket assembly 10 includes a force director 76 attached to the steering column 12 to engage and bend the bend strap 60. The force director 76 has a generally cone shaped configuration and engages or cooperates with the center section 62 of the bend strap 60. The force director 76 is secured to the rigid sleeve 14 by suitable means such as welding.

Figure 7:
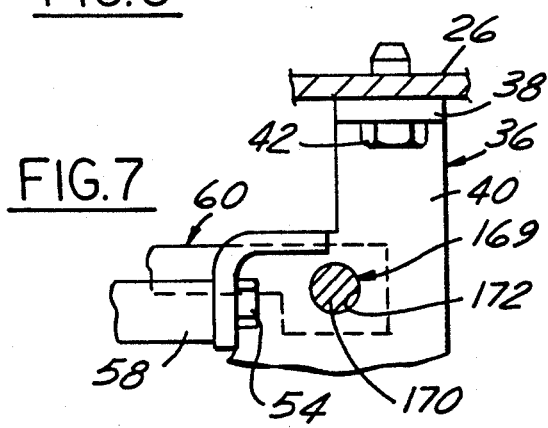
FIG. 7 is a partial view similar to FIG. 4 illustrating a fixed joint attachment for the bend strap.

Referring to FIG. 7, the steering column bracket assembly 10 may include a fixed or non-slip joint attachment or assembly, generally indicated at 169, for joining or connecting together the bend strap 60 and mounting bracket 36. The fixed joint assembly 169 has like parts of the slip joint assembly 69 increased by one hundred (100). In the fixed joint assembly 169, the apertures 72 in the long flange portion 40 are circular to prevent lateral movement of the fasteners 170.

Figure 5:
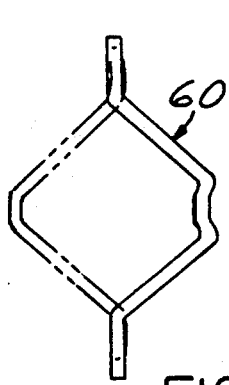
FIG. 5 is a view illustrating a bend strap having a slip joint attachment before and after a collision.
Figure 6:
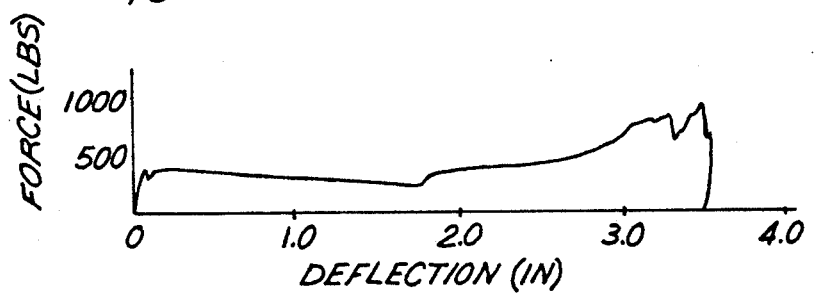
FIG. 6 is a view of a graph of force versus deflection for the bend strap of FIG. 5 during a collision.

In operation, upon a collision type impact, the steering column 12 moves along its longitudinal axis. Simultaneously, the steering column 12 shears the shear member 58 to allow the steering column 12 to break away from the mounting bracket 36. As a result, the force director 76 on the steering column 12 engages the center portion 62 of the bend strap 60 and bends to absorb the impact load. The bend strap 60 deflects approximately one and one-half inches (1½") and then collapses approximately one and one-half inches (1½") for a total of three inches (3") of movement along an axis generally parallel to the longitudinal axis of the steering column 12. As illustrated in FIG. 5, the bend strap 60 is illustrated in its original position in solid lines and a bent position in phantom lines after a collision type impact. The bend strap 60 produces a force versus deflection curve as illustrated in FIG. 7. The slip joint assembly 69 allows the bend strap 60 to deflect laterally when engaged by the force director 76 to produce a low initial force at the beginning of the curve for a relatively constant force versus deflection during a collision type impact.

Figure 8:
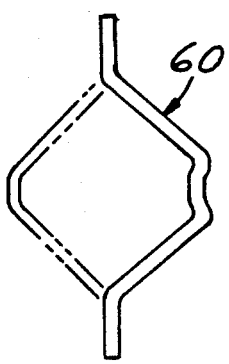
FIG. 8 is a view illustrating the bend strap of FIG. 7 before and after a collision.
Figure 9:
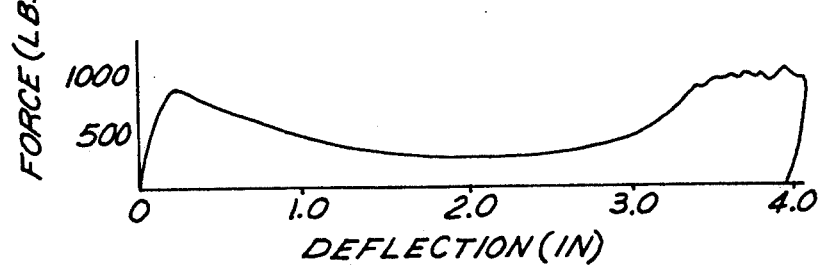
FIG. 9 is a view of a graph of force versus deflection for the bend strap of FIG. 8 during a collision.

Referring to FIG. 8, the bend strap 60 is illustrated in its original position in solid lines and a bent position in phantom lines after a collision type impact. The bend strap 60 produces a force versus deflection curve as illustrated in FIG. 9. The fixed joint assembly 169 produces a higher initial force at the beginning of the curve.

Accordingly, the steering column bracket assembly 10 offers substantially greater stroke without having to increase the span of its end supports or mounting flanges 66. When the steering column bracket assembly 10 incorporates a slip joint assembly 69, the bend strap 60 yields a relatively constant force versus deflection curve without a plurality of deformable parts.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A steering column bracket assembly for a collapsible energy absorbing vehicle steering column, comprising:
   at least one support bracket for attaching one portion of the steering column to vehicle support structure;
   a mounting bracket for attaching another portion of the steering column to vehicle support structure and including shearable means for restraining movement of the steering column along its longitudinal axis;
   bendable means joined to said mounting bracket for absorbing energy of the steering column during a collision type impact;
   joint means for joining said bendable means and said mounting bracket together, said joint means comprising said bendable means including means forming first apertures extending therethrough, fasteners extending through said first apertures, and said mounting bracket including means forming second apertures extending therethrough, one of said first and second apertures being formed to allow lateral movement of said fasteners.

2. A steering column bracket assembly as set forth in claim 1, wherein said joint means comprises said bendable means including means forming first apertures extending therethrough, fasteners extending through said first apertures, and said mounting bracket including means forming second apertures extending therethrough which are formed to prevent lateral movement of said fasteners.

3. A steering column bracket assembly as set forth in claim 1 whereas said bendable means comprises a bend strap having a laterally extending center section and inclined side sections extending from said center section, and a mounting flange extending outwardly from said side sections.

4. A steering column bracket assembly as set forth in claim 3 including means for bending said bend strap.

5. A steering column bracket assembly as set forth in claim 4 wherein said bending means comprises a force director secured to the steering column and adapted to engage said center section of said bend strap.

6. A steering column bracket assembly as set forth in claim 1 including guide means for guiding the steering column along its longitudinal axis during a collision type impact.

7. A steering column bracket assembly as set forth in claim 6 wherein said mounting bracket includes means forming an aperture extending therethrough to receive the steering column.

8. A steering column bracket assembly as set forth in claim 7 wherein said guide means comprises a plurality of flanges extending longitudinally adjacent said aperture.

9. A steering column bracket assembly as set forth in claim 1 wherein said shearable means comprises a shear member extending laterally and partially overlapping one end of the steering column.

10. A steering column bracket assembly for a collapsible energy absorbing vehicle steering column, comprising:
    at least one support bracket for attaching one portion of the steering column to vehicle support structure;
    a mounting bracket for attaching another portion of the steering column to vehicle support structure;
    a bend strap having a laterally extending center section and inclined side sections extending from said center section, and a mounting flange extending outwardly from said side sections and
    jointed to said mounting bracket for absorbing energy of the steering column during a collision type impact of the vehicle;
    joint means for joining said bend strap and said mounting bracket together;
    said joint means comprising said bend strap including means forming first circular apertures extending through said mounting flanges, fasteners extending through said first circular apertures, said mounting bracket including means forming second circular apertures extending therethrough.

11. A steering column bracket assembly for a collapsible energy absorbing vehicle steering column, comprising:
    at least one support bracket for attaching one portion of the steering column to vehicle support structure;
    a mounting bracket for attaching another portion of the steering column to vehicle support structure;
    a bend strap having a laterally extending center section and inclined outwardly side sections extending from said center section, and a mounting flange extending outwardly from said side sections and joined to said mounting bracket for absorbing energy of the steering column during a collision type impact;
    a force director secured to the steering column and adapted to engage said center section of said bend strap for bending said bend strap;
    said bendable strap including means forming first apertures extending therethrough, fasteners extending through said first circular apertures, and said mounting bracket including means forming second circular apertures extending therethrough;
    said mounting bracket includes means forming an aperture extending therethrough to receive the steering column and a plurality of flanges extending longitudinally adjacent said aperture and a fastener extending laterally adjacent said aperture and opposite said flanges for guiding the steering column along its longitudinal axis during a collision type impact; and
    a shear member disposed about said fastener and extending laterally and partially overlapping one end of the steering column.

12. A steering column bracket assembly for a collapsible energy absorbing vehicle steering column, comprising:
    at least one support bracket for attaching one portion of the steering column to vehicle support structure;
    a mounting bracket for attaching another portion of the steering column to vehicle support structure;
    a bend strap having a laterally extending center section and inclined outwardly side sections extending from said center section, and a mounting flange extending outwardly from said side sections and attached to said mounting bracket for absorbing energy of the steering column during a collision type impact;
    said bend strap including means forming first apertures extending therethrough, fasteners extending through said first apertures, and said mounting bracket including means forming second apertures extending therethrough, one of said first and second apertures being elongated to allow lateral movement of said fasteners;

a force director secured to the steering column and adapted to engage said center section of said bend strap for bending said bend strap;

said mounting bracket includes means forming an aperture extending therethrough to receive the steering column and a plurality of flanges extending longitudinally adjacent said aperture and a fastener extending laterally adjacent said aperture and opposite said flanges for guiding the steering column along its longitudinal axis during a collision type impact; and a shear member disposed about said fastener and extending laterally and partially overlapping one end of said steering column.

13. A steering column bracket assembly for a collapsible energy absorbing vehicle steering column, comprising:

at least one support bracket for attaching one portion of the steering column to vehicle support structure;

a mounting bracket for attaching another portion of the steering column to vehicle support structure;

a bend strap having a laterally extending center section and inclined side sections extending from said center section, and a mounting flange extending outwardly from said side sections and joined to said mounting bracket for absorbing energy of the steering column during a collision type impact of the vehicle;

joint means for joining said bend strap and said mounting bracket together;

said joint means comprising said bend strap including means forming first apertures extending therethrough, fasteners extending through said first apertures, and said mounting bracket including means forming second apertures extending therethrough, one of said first and second apertures being elongated to allow lateral movement of said fasteners.

* * * * *